US007208565B1

(12) United States Patent
Nakajima et al.

(10) Patent No.: US 7,208,565 B1
(45) Date of Patent: *Apr. 24, 2007

(54) POLYMERIZATION CATALYST FOR POLYESTERS, POLYESTER PRODUCED WITH THE SAME, AND PROCESS FOR PRODUCTION OF POLYESTER

(75) Inventors: Takahiro Nakajima, Ohtsu (JP); Ken-ichi Tsukamoto, Ohtsu (JP); Shoichi Gyobu, Ohtsu (JP); Mitsuyoshi Kuwata, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/049,438

(22) PCT Filed: Aug. 24, 2000

(86) PCT No.: PCT/JP00/05728

§ 371 (c)(1),
(2), (4) Date: May 30, 2002

(87) PCT Pub. No.: WO01/14448

PCT Pub. Date: Mar. 1, 2001

(30) Foreign Application Priority Data

Aug. 24, 1999 (JP) .................... 11-237485

(51) Int. Cl.
*C08G 63/84* (2006.01)
*C08G 63/86* (2006.01)
*B01J 31/18* (2006.01)
*B01J 31/00* (2006.01)

(52) U.S. Cl. .................. 528/282; 528/286; 528/285; 528/275; 502/155; 502/162; 502/152; 502/150; 502/208

(58) Field of Classification Search ............... 502/129, 502/103, 208, 152, 155, 162, 150, 121, 132; 528/275, 282, 285, 286
See application file for complete search history.

(56) References Cited

U.S. PATENT DOCUMENTS

| 3,329,651 | A | | 7/1967 | Dobinson |
| 3,528,945 | A | | 9/1970 | Price et al. |
| 3,528,946 | A | | 9/1970 | Price et al. |
| 3,533,793 | A | | 10/1970 | Price et al. |
| 3,574,174 | A | * | 4/1971 | Bayer et al. ............... 526/100 |
| 3,594,347 | A | | 7/1971 | Lazarus et al. |
| 3,847,873 | A | * | 11/1974 | Jackson et al. ............ 528/281 |
| 4,192,775 | A | * | 3/1980 | Rekers et al. ............. 502/117 |
| 4,242,479 | A | * | 12/1980 | Yokota et al. ............. 526/125.5 |
| 4,318,799 | A | * | 3/1982 | Yoo ........................ 208/114 |
| 4,382,132 | A | * | 5/1983 | Kelley et al. .............. 526/145 |
| 4,493,903 | A | * | 1/1985 | Mack ........................ 502/121 |
| 4,565,845 | A | | 1/1986 | Inoue et al. |
| 4,829,113 | A | | 5/1989 | Rosenfeld |
| H766 | H | | 4/1990 | Yu |
| 4,931,573 | A | * | 6/1990 | Wada et al. ................ 549/325 |
| 4,972,036 | A | * | 11/1990 | Elmore et al. ............. 526/210 |
| 5,237,042 | A | | 8/1993 | Kim et al. |
| 5,260,246 | A | | 11/1993 | Yuo et al. |
| 5,326,831 | A | | 7/1994 | Yezrielev et al. |
| 5,334,671 | A | | 8/1994 | Yezrielev et al. |
| 5,391,700 | A | | 2/1995 | Itoh et al. |
| 5,399,607 | A | | 3/1995 | Nanbu et al. |
| 5,512,340 | A | | 4/1996 | Goodley |
| 5,554,720 | A | | 9/1996 | Weaver et al. |
| 5,561,183 | A | | 10/1996 | Kwon et al. |
| 5,596,069 | A | | 1/1997 | Goodley |
| 5,639,825 | A | | 6/1997 | Nanbu et al. |
| 5,652,033 | A | | 7/1997 | Goodley |
| 5,674,801 | A | | 10/1997 | George |
| 5,693,786 | A | | 12/1997 | Tanaka et al. |
| 5,719,214 | A | | 2/1998 | Tanaka et al. |
| 5,733,969 | A | * | 3/1998 | Thiele ....................... 524/791 |
| 5,744,572 | A | | 4/1998 | Schumann et al. |
| 5,770,682 | A | | 6/1998 | Ohara et al. |
| 5,782,935 | A | | 7/1998 | Hirt et al. |
| 5,847,011 | A | | 12/1998 | Terado et al. |
| 5,859,102 | A | * | 1/1999 | Pfaendner et al. .......... 524/117 |
| 5,869,582 | A | | 2/1999 | Tang et al. |

(Continued)

FOREIGN PATENT DOCUMENTS

CA 2253515 * 3/1998

(Continued)

OTHER PUBLICATIONS

Adding Value to Polymers, Ciba Specialty Chemicals, K.K., Publ. No. J-99-001, pp. 8 and 12.

(Continued)

*Primary Examiner*—Ling-Sui Choi
*Assistant Examiner*—Rip A. Lee
(74) *Attorney, Agent, or Firm*—Kenyon & Kenyon LLP

(57) ABSTRACT

This invention provides a novel polycondensation catalyst using no antimony compound, polyester produced by using the same, and a process for producing polyester. A novel catalyst comprising an aluminum compound and a phosphorus compound is used as the polycondensation catalyst in producing polyester. The polyester of this invention can be applied to fibers for clothes, fibers for industrial materials, various films, sheets and molded articles such as bottles and engineering plastics, as well as coatings and adhesives.

20 Claims, No Drawings

U.S. PATENT DOCUMENTS

| | | | |
|---|---|---|---|
| 6,080,303 A * | 6/2000 | Cao et al. | 208/120.01 |
| 6,156,867 A | 12/2000 | Aoyama et al. | |
| 6,239,200 B1 | 5/2001 | Kao et al. | |
| 6,392,005 B1 | 5/2002 | Jen | |
| 6,489,434 B2 | 12/2002 | Jen | |
| 6,589,324 B2 | 7/2003 | Kamo et al. | |
| 2003/0045673 A1 * | 3/2003 | Nakajima et al. | 528/282 |
| 2003/0083191 A1 * | 5/2003 | Nakajima et al. | 502/100 |

FOREIGN PATENT DOCUMENTS

| | | |
|---|---|---|
| CH | 495 395 A | 8/1970 |
| CN | 1153185 | 7/1997 |
| EP | 0 419 669 A1 | 4/1991 |
| EP | 0 626 402 A2 | 11/1994 |
| EP | 0 909 775 A1 | 4/1999 |
| GB | 1 348146 | 3/1974 |
| GB | 1348146 * | 3/1974 |
| JP | 46 5395 | 11/1971 |
| JP | 46-40711 | 12/1971 |
| JP | S46-41031 | 12/1971 |
| JP | S49-32676 | 9/1974 |
| JP | 55 116722 | 9/1980 |
| JP | 60 053532 | 3/1985 |
| JP | 60 035023 | 7/1985 |
| JP | 61 101527 | 5/1986 |
| JP | 03 215522 | 9/1991 |
| JP | 03 231918 | 10/1991 |
| JP | 4-3409 | 1/1992 |
| JP | 4-49846 | 8/1992 |
| JP | 4-49847 | 8/1992 |
| JP | 5-287064 | 11/1993 |
| JP | 06 279579 | 10/1994 |
| JP | 7-53691 | 2/1995 |
| JP | 08 073581 | 3/1996 |
| JP | 8 193127 | 7/1996 |
| JP | 8-301994 | 11/1996 |
| JP | 9-31308 | 2/1997 |
| JP | 9-151242 | 6/1997 |
| JP | 9-151243 | 6/1997 |
| JP | 9-151244 | 6/1997 |
| JP | 09 291141 | 11/1997 |
| JP | 10 036495 | 2/1998 |
| JP | 10 251394 | 9/1998 |
| JP | 10259296 | 9/1998 |
| JP | 10324741 | 12/1998 |
| JP | 11-49852 | 2/1999 |
| JP | 11228681 | 8/1999 |
| JP | 11228682 | 8/1999 |
| JP | 2000 63504 | 2/2000 |
| JP | 2000-302854 | 10/2000 |
| JP | 2001-26639 | 1/2001 |
| JP | 2001-131274 | 5/2001 |
| JP | 2001 131276 | 5/2001 |
| JP | 2001 163964 | 6/2001 |
| JP | 2001 278970 | 10/2001 |
| WO | WO 96/11978 | 4/1996 |
| WO | WO 96/41828 | 12/1996 |
| WO | WO98/42769 | 10/1998 |
| WO | WO 99/28033 | 6/1999 |
| WO | WO 99/28033 A1 * | 6/1999 |
| WO | WO00/24804 | 5/2000 |
| WO | WO 00/71252 A1 | 11/2000 |
| WO | WO 01/42335 A1 | 6/2001 |
| WO | WO 03/004547 A2 | 6/2002 |
| WO | WO 02/068500 A1 | 9/2002 |

OTHER PUBLICATIONS

The Specification and claims of U.S. Appl. No. 09/830,223, filed Nov. 18, 2003.

The Specification and Claims of U.S. Appl. No. 10/186,634, filed Jul. 2, 2002.

The specification and claims of U.S. Appl. No. 10/169,491, filed Jul. 3, 2002.

"Experimental Results: 1. PET Polymerization Experiment using Aluminum Acetylacetonate/Lithium Acetate (0.014 mol-%/0.025 mol-%) as catalyst; 2. PET Polymerization Experiment using Aluminum Acetylacetonate/Lithium Acetate (0.014mol-%/0.1 mol-%) as catalyst," conducted by (Exp. 1, polymerization) M. Kuwata (according to direction of T. Nakajima), Sep. 9, 1999; (Exp. 1, measurement of TD) T. Nakajima, Oct. 26, 1999; (Exp. 2, polymerization) M. Kuwata (according to direction of T. Nakajima), Jun. 14, 2000; (Exp. 2, measurement of TD) T. Nakajima, Aug. 11, 2000.

* cited by examiner

POLYMERIZATION CATALYST FOR POLYESTERS, POLYESTER PRODUCED WITH THE SAME, AND PROCESS FOR PRODUCTION OF POLYESTER

BACKGROUND OF THE INVENTION

1. Field of the Invention

This invention relates to a polyester polymerization catalyst, polyester produced by using the same and a process for producing polyester and in particular to an antimony compound-free novel polyester polymerization catalyst, polyester produced by using the same and a process for producing polyester.

2. Prior Art

Polyester, particularly polyethylene terephthalate (abbreviated hereinafter into PET), is superior in mechanical and chemical properties and applied to various uses such as fibers for clothes and industrial materials, various films such as packaging films and magnetic tapes and sheets, and molded articles such as bottles and engineering plastics.

PET is obtained industrially by esterification or transesterification of terephthalic acid or dimethyl terephthalate with ethylene glycol thereof to produce bis(2-hydroxyethyl) terephthalate and subsequent polycondensation thereof with a catalyst at high temperature in vacuo. As the catalyst used in this polycondensation, antimony trioxide is widely used. Antimony trioxide is a catalyst which is inexpensive and superior in the catalytic activity, but since an antimony metal is precipitated during polycondensation, there is the problem of gray discoloration and formation of insoluble particles in PET. Further, a problem with the safety of antimony is recently noted from an environmental viewpoint. Under these circumstances, there is demand for polyester containing no or little antimony.

While using antimony trioxide as the polycondensation catalyst, an attempt at inhibiting occurrence of gray discoloration and formation of insoluble particles in PET has been made. In Japanese Patent No. 2666502, for example, antimony trioxide and bismuth and selenium compounds are used as the polycondensation catalyst, whereby formation of gray insoluble particles in PET is inhibited. Further, Japanese Unexamined Patent Publication No. 291141/1997 describes that when antimony trioxide containing sodium and iron oxides is used as the polycondensation catalyst, precipitation of an antimony metal is inhibited. However, these polycondensation catalysts cannot achieve the object of obtaining polyester containing no or little antimony.

A polycondensation catalyst substituted for antimony trioxide has also been investigated. In particular, a titanium compound represented by tetraalkoxy titanate has already been proposed, but there is the problem that PET produced using this compound is significantly discolored and easily thermally degraded.

As an attempt to overcome such problem when tetraalkoxy titanate is used as the polycondensation catalyst, for example Japanese Unexamined Patent Publication No. 116722/1980 has proposed a method of using tetraalkoxy titanate with a cobalt salt and a calcium salt. Further, Japanese Unexamined Patent Publication No. 73581/1996 has proposed a method of using tetraalkoxy titanate simultaneously with a cobalt compound as the polycondensation catalyst and simultaneously using a optical brightener. By these proposes, the discoloration of PET is reduced when tetraalkoxy titanate is used as the polycondensation catalyst, but effective inhibition of thermal degradation of PET has not been achieved.

As a polycondensation catalyst which is substituted for antimony trioxide and overcomes such problem when tetraalkoxy titanate is used, a germanium compound has been practically used, but this catalyst has the problem that it is very expensive and that the catalyst easily evaporates from the reaction system to the outside so that the concentration of the catalyst in the reaction system is changed thus making control of polymerization difficult.

It is known that aluminum compounds are generally inferior in the catalytic activity. Among the aluminum compounds, aluminum chelate compounds are reported to have a higher catalytic activity as a polycondensation catalyst than other aluminum compounds, but the catalytic activity is not practically sufficient as compared with the antimony compounds and titanium compounds described above.

This invention provides a novel polycondensation catalyst other than antimony compounds, polyester produced by using the same and a process for producing polyester.

SUMMARY OF THE INVENTION

The present inventors made extensive examination for solving the problems described above, and as a result, they surprisingly found that as a polycondensation catalyst, an aluminum compound, though being originally inferior in the catalytic activity, came to have a sufficient activity by allowing a phosphorus compound to be coexistent therewith, thus arriving at this invention. When the polycondensation catalyst of this invention is used, polyester superior in qualities can be obtained without using the antimony compound.

That is, this invention provides a polyester polymerization catalyst, which comprises an aluminum compound and a phosphorus compound, polyester produced by using the same and a process for producing polyester, as a method of solving the problems above.

This invention provides a novel polycondensation catalyst other than antimony compounds, polyester produced by using the same, and a process for producing polyester. The polycondensation catalyst of this invention is a polyester polymerization catalyst, which comprises an aluminum compound and a phosphorus compound, as follows:

① a polyester polymerization catalyst, which comprises an aluminum compound and a phosphorus compound;

② the polyester polymerization catalyst according to the above-described ①, wherein the phosphorus compound is at least one compound selected from the group consisting of a phosphonic acid based compound, a phosphinic acid based compound, a phosphine oxide based compound, a phosphonous acid based compound, a phosphinous acid based compound, and a phosphine based compound;

③ the polyester polymerization catalyst according to the above-described ①, wherein the phosphorus compound is at least one phosphonic acid based compound;

④ the polyester polymerization catalyst according to any one of the above-described ① to ③, wherein the phosphorus compound is a compound having an aromatic ring structure;

⑤ the polyester polymerization catalyst according to the above-described ①, wherein the phosphorus compound is at least one compound selected from the group consisting of the compounds represented by the following Formulae (1) to (3):

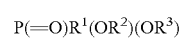 (Formula 1)

  (Formula 2)

  (Formula 3)

(wherein $R^1$, $R^4$, $R^5$ and $R^6$ independently represent hydrogen, a $C_{1-50}$ hydrocarbon group, and a $C_{1-50}$ hydrocarbon group containing a hydroxyl group, a halogen group, an alkoxy group or an amino group, and $R^2$ and $R^3$ independently represent hydrogen and a $C_{1-10}$ hydrocarbon group, provided that the hydrocarbon group may contain an alicyclic structure or an aromatic ring structure);

⑥ the polyester polymerization catalyst according to the above-described ⑤, wherein each of $R^1$, $R^4$, $R^5$ and $R^6$ is a group having an aromatic ring structure;

⑦ the polyester polymerization catalyst according to any one of the above-described ① to ⑥, characterized in that one or more metals and/or metal compounds selected from the group consisting of alkali metals or compounds thereof and alkaline earth metals or compounds thereof are coexistent therewith;

⑧ polyester produced by using a catalyst described in any one of the above-described ① to ⑦; and ⑨ a process for producing polyester which comprises using a catalyst described in any one of the above-described ① to ⑦ in producing polyester.

DETAILED DESCRIPTION

The aluminum compound constituting the polycondensation catalyst of this invention includes, but is not limited to, e.g. carboxylates such as aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate and aluminum salicylate, inorganic acid salts such as aluminum chloride, aluminum hydroxide, aluminum hydroxide chloride, aluminum carbonate, aluminum phosphate and aluminum phosphonate, aluminum alkoxides such as aluminum methoxide, aluminum ethoxide, aluminum n-propoxide, aluminum iso-propoxide, aluminum n-butoxide and aluminum t-butoxide, aluminum chelate compounds such as aluminum acetylacetonate, aluminum acetylacetate, aluminum ethyl acetoacetate, and aluminum ethyl acetoacetate di-iso-propoxide, organoaluminum compounds such as trimethyl aluminum and triethyl aluminum and partially hydrolyzates thereof, as well as aluminum oxides, metal aluminum, etc. Among these, the carboxylates, inorganic acid salts and chelate compounds are preferable, among which aluminum acetate, aluminum chloride, aluminum hydroxide, aluminum hydroxide chloride and aluminum acetylacetonate are particularly preferable.

The amount of the aluminum compound used in the invention is preferably $5 \times 10^{-7}$ to 0.01 mole, more preferably $1 \times 10^{-6}$ to 0.005 mole, relative to the number of moles of all constitutive units of carboxylic acid components such as dicarboxylic acid and polyfunctional carboxylic acid components in the resulting polyester.

The phosphorus compound constituting the polycondensation catalyst of the invention is not particularly limited, but at least one compound selected from the group consisting of a phosphonic acid based compound, a phosphinic acid based compound, a phosphine oxide based compound, a phosphonous acid based compound, a phosphinous acid based compound, and a phosphine based compound is preferably used for a significant effect of improving the catalytic activity.

Among these, at least one phosphonic acid based compound is preferably used for a particularly significant effect of improving the catalytic activity.

The phosphonic acid based compound, phosphinic acid based compound, phosphine oxide based compound, phosphonous acid based compound, phosphinous acid based compound and phosphine based compound mentioned in the invention refer respectively to compounds having the structures shown in the following Formulae (4) to (9):

  (Formula 4)

  (Formula 5)

  (Formula 6)

  (Formula 7)

  (Formula 8)

  (Formula 9)

The phosphonic acid based compound in this invention includes e.g. dimethyl methylphosphonate, diphenyl methylphosphonate, dimethyl phenylphosphonate, diethyl phenylphosphonate, diphenyl phenylphosphonate, dimethyl benzylphosphonate and diethyl benzylphosphonate.

The phosphinic acid based compound in this invention includes e.g. diphenylphosphinic acid, methyl diphenylphosphinate, phenyl diphenylphosphinate, phenylphosphinic acid, methyl phenylphosphinate and phenyl phenylphosphinate.

The phosphine oxide based compound in this invention includes e.g. diphenyl phosphine oxide, methyl diphenyl phosphine oxide and triphenyl phosphine oxide.

Among the phosphorus compounds described above, those compounds having an aromatic ring structure are preferably used for a significant effect of improving the catalytic activity.

As the phosphorus compound constituting the polycondensation catalyst of the invention, a compound represented by the following Formulae (1) to (3) is preferably used for a particularly significant effect of improving the catalytic activity.

  (Formula 1)

  (Formula 2)

  (Formula 3)

(wherein $R^1$, $R^4$, $R^5$ and $R^6$ independently represent hydrogen, a $C_{1-50}$ hydrocarbon group, and a $C_{1-50}$ hydrocarbon group containing a hydroxyl group, a halogen group, an alkoxy group or an amino group, and $R^2$ and $R^3$ independently represent hydrogen and a $C_{1-10}$ hydrocarbon group, provided that the hydrocarbon group may contain an alicyclic structure such as cyclohexyl or an aromatic ring structure such as phenyl and naphthyl.)

The phosphorus compound constituting the polycondensation catalyst of the invention is particularly preferably a compound of Formulae (1) to (3) above wherein each of $R^1$, $R^4$, $R^5$ and $R^6$ is a group having an aromatic ring structure.

The phosphorus compound constituting the polycondensation catalyst of the invention includes e.g. dimethyl methylphosphonate, diphenyl methylphosphonate, dimethyl phenylphosphonate, diethyl phenylphosphonate, diphenyl phenylphosphonate, dimethyl benzylphosphonate, diethyl benzylphosphonate, diphenylphosphinic acid, methyl diphenylphosphinate, phenyl diphenylphosphinate, phenylphosphinic acid, methyl phenylphosphinate, phenyl phenylphosphinate, diphenyl phosphine oxide, methyl diphenyl phosphine oxide and triphenyl phosphine oxide. Among these, dimethyl phenylphosphinate and diethyl benzylphosphinate are particularly preferable.

The amount of the phosphorus compound used in the invention is preferably $5\times10^{-7}$ to 0.01 mole, more preferably $1\times10^{-6}$ to 0.005 mole, relative to the number of moles of all constitutive units of carboxylic acid components such as dicarboxylic acid and polyfunctional carboxylic acid components in the resulting polyester.

For a further effect of improving the catalytic activity, it is preferable that one or more metal compounds selected from the group consisting of alkali metals or compounds thereof and alkaline earth metals or compounds thereof are coexistent with the polycondensation catalyst of this invention comprising the aluminum compound and the phosphorus compound.

The alkali metals or compounds thereof or the alkaline earth metal or compounds thereof in this invention are not particularly limited insofar as they are alkali metals or alkaline earth metals or one or more compounds selected from the group consisting of Li, Na, K, Rb, Cs, Be, Mg, Ca, Sr and Ba compounds; for example, these metal compounds include saturated aliphatic carboxylates such as formate, acetate, propionate, butyrate and oxalate, unsaturated aliphatic carboxylates such as acrylate and methacrylate, aromatic carboxylates such as benzoate, halogen-containing carboxylates such as trichloroacetate, hydroxycarbonates such as lactate, citrate and salicylate, inorganic acid salts such as carbonate, sulfate, nitrate, phosphate, phosphonate, hydrogen carbonate, hydrogen phosphate, hydrogen sulfate, sulfite, thiosulfate, hydrochloride, hydrobromate, chlorate and bromate, organic sulfonates such as 1-propane sulfonate, 1-pentane sulfonate and naphthalene sulfonate, organic sulfates such as lauryl sulfate, alkoxides such as methoxy, ethoxy, n-propoxy, iso-propoxy, n-butoxy and t-butoxy, chelate compounds such as acetylacetonate, oxides and hydroxides, among which saturated aliphatic carboxylates are preferable and acetate is most preferable.

The amount of these alkali metal or compounds thereof or alkaline earth metals or compounds thereof used is preferably in the range of $1\times10^{-6}$ to 0.1 mole, more preferably in the range of 5×10–6 to 0.05 mole, relative to the number of moles of all constitutive units of carboxylic acid components such as dicarboxylic acid and poly functional carboxylic acid components in the resulting polyester.

Production of polyester according to this invention can be conducted by a method known in the art. For example, PET can be produced by a method of esterifying terephthalic acid with ethylene glycol and subsequent polycondensation reaction, or a method of transesterification reaction between alkyl terephthalate such as dimethyl terephthalate and ethylene glycol and subsequent polycondensation reaction. Further, the polymerization apparatus may be a batch type or continuous reaction type.

The catalyst of this invention has a catalytic activity not only in polycondensation reaction but also in esterification reaction and transesterification reaction. The transesterification reaction between alkyl dicarboxylate such as dimethyl terephthalate and glycol such as ethylene glycol is conducted usually in the presence of a transesterification catalyst such as zinc, and in place of such catalyst or in coexistence of such catalyst, the catalyst of this invention can also be used. Further, the catalyst of this invention has a catalytic activity not only in melt state polymerization but also in solid state polymerization and solution polymerization.

The polycondensation catalyst of this invention is added desirably before polycondensation reaction, but the catalyst can also be added to the reaction system in an arbitrary stage before or during esterification reaction or transesterification reaction.

The polycondensation catalyst of this invention may be added in any form such as powder, neat, or a slurry or solution in a solvent such as ethylene glycol. Alternatively, a mixture prepared by previously mixing the aluminum compound with the phosphorus compound may be added, or the compounds comprising the catalyst may be separately added. Further, a mixture prepared by previously mixing the two or more compounds with alkali metals or compounds thereof or alkaline earth metals or compounds thereof may be added, or these compounds may be added separately.

For polymerization of polyester by use of the polymerization catalyst of the invention, an antimony compound and a germanium compound may be used in combination with the catalyst. In this case, the antimony compound is preferably added in an amount of 50 ppm or less (in terms of antimony atom) relative to the polyester obtained by polymerization. The antimony compound is added more preferably in an amount of 30 ppm or less. Addition of antimony in an amount of more than 50 ppm is not preferable because an antimony metal is precipitated resulting in the gray discoloration and formation of insoluble particles in the polyester. The germanium compound is added preferably in an amount of 20 ppm or less (in terms of germanium atom) in the polyester obtained by polymerization. The germanium compound is added more preferably in an amount of 10 ppm or less. Addition of germanium in an amount of more than 20 ppm is economically disadvantageous and thus not preferable.

The antimony compound used in this invention includes antimony trioxide, antimony pentaoxide, antimony acetate and antimony glycoxide, among which antimony trioxide is preferable. The germanium compound includes germanium dioxide and germanium tetrachloride, among which germanium dioxide is preferable.

With the polymerization catalyst of this invention, other polymerization catalysts such as titanium compound, tin compound and cobalt compound can be coexistent in such amount as not to deteriorate the thermal stability and color tone of polyester.

The polyester mentioned in the invention refers to polyester comprising at least one component selected from polyfunctional carboxylic acids including dicarboxylic acids and ester-forming derivatives thereof and at least one component selected from polyfunctional alcohols including glycols, to polyester comprising hydroxycarboxylic acids and ester-forming derivatives thereof, or to polyester comprising cyclic esters.

The dicarboxylic acids may include at least one of the following compound; saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimer acids or ester-forming derivatives thereof, unsaturated aliphatic dicarboxylic acids such as fumaric acid, maleic acid and itaconic acid or ester-forming derivatives thereof, aromatic dicarboxylic acids such as orthophthalic acid, isophthalic acid, terephthalic acid, 5-(alkali metal) sulfoisophthalic acid, diphenic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyl dicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, pamoic acid and anthracene dicarboxylic acid or ester-forming derivatives thereof. And among these dicarboxylic acids, terephthalic acid and naphthalene dicarboxylic acid particularly 2,6-naphthalene dicarboxylic acid are preferable.

Polyfunctional carboxylic acids other than these dicarboxylic acids may include ethane tricarboxylic acid, propane tricarboxylic acid, butane tetracarboxylic acid, pyromellitic acid, trimellitic acid, trimesic acid and 3,4,3',4'-biphenyl tetracarboxylic acid, as well as ester-forming derivatives thereof.

The glycols may include at least one of the following compound; aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cyclohexane diol, 1,3-cyclohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol, polyethylene glycol, polytrimethylene glycol, and polytetramethylene glycol, and aromatic glycols such as hydroquinone, 4,4'-dihydroxy bisphenol, 1,4-bis(β-hydroxyethoxy) benzene, 1,4-bis(β-hydroxyethoxyphenyl) sulfone, bis(p-hydroxyphenyl) ether, bis(p-hydroxyphenyl)sulfone, bis(p-hydroxyphenyl)methane, 1,2-bis(p-hydroxyphenyl) ethane, bisphenol A, bisphenol C, 2,5-naphthalene diol, as well as glycols having ethylene oxide added to the above glycols, and among these glycols, ethylene glycol and 1,4-butylene glycol are preferable.

Polyfunctional alcohols other than these glycols include trimethylol methane, trimethylol ethane, triemethylol propane, pentaerythritol, glycerol, hexane triol etc.

The hydroxycarboxylic acids may include lactic acid, citric acid, malic acid, tartaric acid, hydroxyacetic acid, 3-hydroxybutyric acid, p-hydroxybenzoic acid, p-(2-hydroxyethoxy) benzoic acid, 4-hydroxycyclohexane carboxylic acid, or ester-forming derivatives thereof.

The cyclic esters include ε-caprolactone, β-propiolactone, β-methyl-β-propiolactone, δ-valerolactone, glucolide and lactide.

Further, the polyester of this invention can contain a known phosphorus compound as a copolymerizable component. The phosphorus compound is preferably a bifunctional phosphorus compound, and examples thereof include dimethyl phenylphosphonate, diphenyl phenylphosphonate, (2-carboxylethyl) methylphosphinic acid, (2-carboxylethyl) phenylphosphinic acid, methyl(2-methoxycarboxylethyl) phenylphosphinate, methyl (4-methoxycarbonylphenyl) phenylphosphinate, [2-(β-hydroxyethoxycarbonyl)ethyl] methylphosphinic acid ethylene glycol ester, (1,2-dicarboxyethyl) dimethyl phosphine oxide, 9,10-dihydro-10-oxa-(2,3-carboxypropyl)-10-phosphaphenanthrene-10-oxide, etc. By incorporating these phosphorus based compounds as copolymerizable components, the resulting polyester can improve flame retardancy etc.

The ester-forming derivatives of polyfunctional carboxylic acids or hydroxycarboxylic acids include alkyl esters, acid chlorides and acid anhydrides of such acids.

The polyester of this invention is preferably polyester whose main acid component is terephthalic acid or an ester-forming derivative thereof or naphthalene dicarboxylic acid or an ester-forming derivative thereof and whose main glycol component is alkylene glycol. The polyester whose main acid component is terephthalic acid or an ester-forming derivative thereof or naphthalene dicarboxylic acid or an ester-forming derivative thereof is polyester wherein the total of terephthalic acid or an ester-forming derivative thereof or naphthalene dicarboxylic acid or an ester-forming derivative thereof is preferably 70 mole % or more, more preferably 80 mole % or more, and most preferably 90 mole % or more, to the total acid components. The polyester whose main glycol component is alkylene glycol is polyester wherein the total of alkylene glycol is preferably 70 mole % or more, more preferably 80 mole % or more, and most preferably 90 mole % or more, to the total glycol components. As used herein, the alkylene glycol may contain a substituent group or an alicyclic structure in the molecular chain thereof.

The naphthalene dicarboxylic acid or ester-forming derivatives thereof used in this invention are preferably 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid or ester-forming derivatives thereof.

The alkylene glycol used in this invention includes ethylene glycol, 1,2-propylene glycol, 1,3-propylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cyclohexane diol, 1,3-cyclohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, and 1,12-dodecane diol. These may be used in combination thereof.

The polyester of this invention can, as acid components other than terephthalic acid or an ester-forming derivative thereof and naphthalene dicarboxylic acid or an ester-forming derivative thereof, contain saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimer acids or ester-forming derivatives thereof, unsaturated aliphatic dicarboxylic acids such as fumaric acid, maleic acid and itaconic acid or ester-forming derivatives thereof, aromatic dicarboxylic acids such as orthophthalic acid, isophthalic acid, 5-(alkali metal) sulfoisophthalic acid, diphenic acid, 4,4'-biphenyl dicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, pamoic acid and anthracene dicarboxylic acid or ester-forming derivatives thereof, and polyfunctional carboxylic acids such as ethane tricarboxylic acid, propane tricarboxylic acid, butane tetracarboxylic acid, pyromellitic acid, trimellitic acid, trimesic acid and 3,4,3',4'-biphenyl tetracarboxylic acid or ester-forming derivatives thereof. The polyester of this invention can also contain hydroxycarboxylic acids such as lactic acid, citric acid, malic acid, tartaric acid, hydroxyacetic acid, 3-hydroxybutyric acid, p-hydroxybenzoic acid, p-(2-hydroxyethoxy) benzoic acid and 4-hydroxycyclohexane carboxylic acid or ester-forming derivatives thereof. Further, the polyester can also contain cyclic esters such as ε-caprolactone, β-propiolactone, β-methyl-β-propiolactone, δ-valerolactone, glycolide and lactide.

The polyester of the invention can, as glycol components other than alkylene glycol, contain aliphatic glycols such as diethylene glycol, triethylene glycol, polyethylene glycol, polytrimethylene glycol and polytetramethylene glycol, aromatic glycols such as hydroquinone, 4,4'-dihydroxybisphenol, 1,4-bis(β-hydroxyethoxy) benzene, 1,4-bis(β-hydroxyethoxyphenyl) sulfone, bis(p-hydroxyphenyl) ether, bis(p-hydroxyphenyl) sulfone, bis(p-hydroxyphenyl) methane, 1,2-bis(p-hydroxyphenyl) ethane, bisphenol A, bisphenol C, 2,5-naphthalene diol and glycols having ethylene oxide added to the above glycols, and polyfunctional alcohols such as trimethylol methane, trimethylol ethane, trimethylol propane, pentaerythritol, glycerol and hexane triol as copolymerizable components.

The polyester of this invention can contain a known phosphorus based compound as a copolymerizable component. The phosphorus based compound is preferably a bifunctional phosphorus based compound, and examples thereof include dimethyl phenylphosphonate, diphenyl phenylphosphonate, (2-carboxylethyl) methylphosphinic acid, (2-carboxylethyl) phenylphosphinic acid, methyl(2-methoxycarboxylethyl) phenylphosphinate, methyl(4-methoxycarbonylphenyl) phenylphosphinate, [2-(β-hydroxyethoxycarbonyl)ethyl]methylphosphinate ethylene glycol, (1,2-dicarboxyethyl) dimethyl phosphine oxide, 9,10-dihydro-10-oxa-(2,3-carboxypropyl)-10-phosphaphenanthrene-10-oxide, etc. By incorporating these phosphorus based compounds as copolymerizable components, the resulting polyester can improve flame retardancy etc.

The polyester of the invention is preferably polyethylene terephthalate, polybutylene terephthalate, polypropylene terephthalate, poly(1,4-cyclohexanedimethyleneterephthalate), polyethylene naphthalate, polybutylene naphthalate, polypropylene naphthalate and a copolymer thereof, among which polyethylene terephthalate and a copolymer thereof are particularly preferable.

The polyester of this invention can contain antioxidants such as phenolic or aromatic amines, and by containing one or more of these antioxidants, the resultant polyester can improve e.g. thermal stability. The phenolic antioxidants include tetrakis-[methyl-3-(3',5'-di-tert-butyl-4-hydroxyphenyl)propionate]methane, 4,4'-butylidene bis-(3-methyl-6-tert-butylphenol), and 1,3,5-trimethyl-2,4,6-tris(3,5-di-tert-butyl-4-hydroxybenzyl) benzene.

The polyester of this invention may contain other arbitrary polymers, stabilizers, antioxidants, antistatic agents, antifoaming agents, dyeing assistants, dyes, pigments, delusterants, optical brighteners and other additives.

EXAMPLES

Hereinafter, this invention is described in more detail by reference to the Examples, which however are not intended to limit this invention. The intrinsic viscosity (IV) of polyester in each of the Examples and Comparative Examples was measured at a temperature of 30° C. in a 6/4 mixed solvent (ratio by weight) of phenol/1,1,2,2-tetrachloroethane.

Example 1

As the catalyst, 3 g/l aluminum chloride in ethylene glycol was added, in an amount of 0.015 mole % in terms of aluminum relative to the acid component in polyester, to bis(2-hydroxyethyl) terephthalate, and then dimethyl phenylphosphonate was added in an amount of 0.02 mole % relative to the acid component in polyester, and the mixture was stirred at 245° C. for 10 minutes at atmospheric pressure. Then, the mixture was heated over 50 minutes to 275° C., during which the pressure in the reaction system was gradually reduced to 0.1 mmHg, and further polycondensation reaction was conducted for 3 hours at the same temperature and at the same pressure. The intrinsic viscosity of the resulting polymer is shown in Table 1.

Examples 2 to 7 and Comparative Examples 1 to 2

Polyester was polymerized in the same manner as in Example 1 except that the catalyst was changed. The intrinsic viscosity of the resulting polymer is shown in Table 1.

TABLE 1

|  | Catalyst | Amount | IV (dl g$^{-1}$) |
| --- | --- | --- | --- |
| Example 1 | Aluminum chloride | 0.015 mol % | 0.55 |
|  | Dimethyl phenylphosphonate | 0.02 mol % |  |
| Example 2 | Aluminum acetate | 0.03 mol % | 0.57 |
|  | Diethyl benzylphosphonate | 0.01 mol % |  |
| Example 3 | Aluminum hydroxide chloride | 0.05 mol % | 0.62 |
|  | Diphenylphosphinic acid | 0.07 mol % |  |
| Example 4 | Aluminum acetylacetonate | 0.01 mol % | 0.6 |
|  | Dimethyl phenylphosphonate | 0.01 mol % |  |
| Example 5 | Aluminum hydroxide | 0.065 mol % | 0.59 |
|  | Diphenyl phosphine oxide | 0.03 mol % |  |
| Example 6 | Aluminum acetate | 0.01 mol % | 0.6 |
|  | Diethyl benzylphosphonate | 0.005 mol % |  |
|  | Lithium acetate | 0.025 mol % |  |
| Example 7 | Aluminum chloride | 0.005 mol % | 0.62 |
|  | Dimethyl phenylphosphonate | 0.01 mol % |  |
|  | Sodium acetate | 0.05 mol % |  |
| Comparative Example 1 | Aluminum chloride | 0.015 mol % | 0.31 |
| Comparative Example 2 | Dimethyl phenylphosphonate | 0.02 mol % | 0.27 |

According to this invention, there is provided a novel polycondensation catalyst other than antimony compounds as well as polyester produced by using the same. The polyester of this invention can be applied to fibers for clothes, fibers for industrial materials, various films, sheets and molded articles such as bottles and engineering plastics, as well as coatings and adhesives.

What is claimed is:

1. A process for producing polyester, comprising adding a polymerization catalyst in a polycondensation reaction, esterification reaction or transesterification reaction between components comprising at least a polyfunctional alcohol and at least a polyfunctional carboxylic acid or ester-forming derivative of a polyfunctional carboxylic acid to produce the polyester; and obtaining the polyester, wherein the polymerization catalyst comprises an aluminum substance and a phosphorus compound, wherein the aluminum substance is selected from the group consisting of aluminum carboxylates, aluminum salts of an inorganic acid and aluminum chelate compounds, and wherein the phosphorus compound has an aromatic ring structure.

2. The process of claim 1, wherein the phosphorus compound is at least one compound selected from the group consisting of the compounds represented by anyone of Formulae (1) to (3):

$$P(=O)R^1(OR^2)(OR^3) \quad \text{(Formula 1)}$$

$$P(=O)R^1R^4(OR^3) \quad \text{(Formula 2)}$$

$$P(=O)R^1R^5R^6 \quad \text{(Formula 3)}$$

wherein $R^1$, $R^4$, $R^5$ and $R^6$ independently represent hydrogen, a $C_{1-50}$ hydrocarbon group, or a $C_{1-50}$ hydrocarbon group containing a hydroxyl group, a halogen group, an alkoxy group or amino group, and $R^2$ and $R^3$ independently represent hydrogen or a $C_{1-10}$ hydrocarbon group, wherein the hydrocarbon group may contain an alicyclic structure or an aromatic ring structure.

3. A process for producing polyester, comprising adding a polymerization catalyst in a polycondensation reaction, esterification reaction or transesterification reaction between components comprising at least a polyfunctional alcohol and at least a polyfunctional carboxylic acid or ester-forming derivative of a polyfunctional carboxylic acid to produce the polyester; and obtaining the polyester, wherein the polymerization catalyst comprises an aluminum substance and at least one phosphorus compound, wherein the aluminum substance is selected from the group consisting of aluminum carboxylates, aluminum salts of an inorganic acid and aluminum chelate compounds and wherein the at least one phosphorus compound is at least a phosphonic acid compound having an aromatic ring structure.

4. The process of claim 3, wherein the at least one phosphorus compound is at least a compound represented by the formula below:

$$P(=O)R^1(OR^2)(OR^3)$$

wherein $R^2$ and $R^3$ independently represent hydrogen or a $C_{1-10}$ hydrocarbon group, wherein the hydrocarbon group may contain an alicyclic structure or an aromatic ring structure, and wherein $R^1$ is a group having an aromatic ring structure.

5. A process for producing polyester, comprising adding a polymerization catalyst in a polycondensation reaction, esterification reaction or transesterification reaction between components comprising at least a polyfunctional alcohol and at least a polyfunctional carboxylic acid or ester-forming derivative of a polyfunctional carboxylic acid to produce the polyester; and obtaining the polyester, wherein the polymerization catalyst comprises an aluminum substance and at least one phosphorus compound, wherein the aluminum substance is selected from the group consisting of aluminum carboxylates, aluminum salts of an inorganic acid and aluminum chelate compounds and wherein the at least one phosphorus compound is at least a phosphinic acid compound having an aromatic ring structure.

6. The process of claim 1, wherein the aluminum carboxylates are selected from aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, or aluminum salicylate, wherein the aluminum salts of an inorganic acid are selected from aluminum chloride, aluminum hydroxide chloride, aluminum carbonate, aluminum phosphate or aluminum phosphonate, and wherein the aluminum chelate compounds are selected from aluminum acetylacetonate, aluminum acetylacetate, aluminum ethyl acetoacetate, or aluminum ethyl acetoacetate di-isopropoxide.

7. The process of claim 2, wherein the aluminum carboxylates are selected from aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, or aluminum salicylate, wherein the aluminum salts of an inorganic acid are selected from aluminum chloride, aluminum hydroxide chloride, aluminum carbonate, aluminum phosphate or aluminum phosphonate, and wherein the aluminum chelate compounds are selected from aluminum acetylacetonate, aluminum acetylacetate, aluminum ethyl acetoacetate, or aluminum ethyl acetoacetate di-isopropoxide.

8. The process of claim 3, wherein the aluminum carboxylates are selected from aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, or aluminum salicylate, wherein the aluminum salts of an inorganic acid are selected from aluminum chloride, aluminum hydroxide chloride, aluminum carbonate, aluminum phosphate or aluminum phosphonate, and wherein the aluminum chelate compounds are selected from aluminum acetylacetonate, aluminum acetylacetate, aluminum ethyl acetoacetate, or aluminum ethyl acetoacetate di-isopropoxide.

9. The process of claim 4, wherein the aluminum carboxylates are selected from aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, or aluminum salicylate, wherein the aluminum salts of an inorganic acid are selected from aluminum chloride, aluminum hydroxide chloride, aluminum carbonate, aluminum phosphate or aluminum phosphonate, and wherein the aluminum chelate compounds are selected from aluminum acetylacetonate, aluminum acetylacetate, aluminum ethyl acetoacetate, or aluminum ethyl acetoacetate di-isopropoxide.

10. The process of claim 5, wherein the aluminum carboxylates are selected from aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, or aluminum salicylate, wherein the aluminum salts of an inorganic acid are selected from aluminum chloride, aluminum hydroxide chloride, aluminum carbonate, aluminum phosphate or aluminum phosphonate, and wherein the aluminum chelate compounds are selected from aluminum acetylacetonate, aluminum acetylacetate, aluminum ethyl acetoacetate, or aluminum ethyl acetoacetate di-isopropoxide.

11. The process of claim 1, wherein one or more metals and/or metal compounds selected from the group consisting of alkali metals or compounds thereof and alkaline earth metals or compounds thereof are used in combination with the polymerization catalyst.

12. The process of claim 2, wherein one or more metals and/or metal compounds selected from the group consisting of alkali metals or compounds thereof and alkaline earth metals or compounds thereof are used in combination with the polymerization catalyst.

13. The process of claim 3, wherein one or more metals and/or metal compounds selected from the group consisting of alkali metals or compounds thereof and alkaline earth metals or compounds thereof are used in combination with the polymerization catalyst.

14. The process of claim 4, wherein one or more metals and/or metal compounds selected from the group consisting of alkali metals or compounds thereof and alkaline earth metals or compounds thereof are used in combination with the polymerization catalyst.

15. The process of claim 5, wherein one or more metals and/or metal compounds selected from the group consisting of alkali metals or compounds thereof and alkaline earth metals or compounds thereof are used in combination with the polymerization catalyst.

16. The process of claim 1, further comprising adding an antimony compound and a germanium compound in the polycondensation reaction, esterification reaction or transesterification reaction.

17. The process of claim 2, further comprising adding an antimony compound and a germanium compound in the polycondensation reaction, esterification reaction or transesterification reaction.

18. The process of claim 3, further comprising adding an antimony compound and a germanium compound in the polycondensation reaction, esterification reaction or transesterification reaction.

19. The process of claim 4, further comprising adding an antimony compound and a germanium compound in the polycondensation reaction, esterification reaction or transesterification reaction.

20. The process of claim 5, further comprising adding an antimony compound and a germanium compound in the polycondensation reaction, esterification reaction or transesterification reaction.

* * * * *